(No Model.)

D. W. JACOBY.
CHECK ROWER.

No. 289,913. Patented Dec. 11, 1883.

Witnesses:
Frank M. Jacob
Otis S. Smith

Inventor:
Daniel W. Jacoby

UNITED STATES PATENT OFFICE.

DANIEL W. JACOBY, OF ABILENE, KANSAS.

CHECK-ROWER.

SPECIFICATION forming part of Letters Patent No. 289,913, dated December 11, 1883.

Application filed July 27, 1883. (No model.)

*To all whom it may concern:*

Be it known that I, DANIEL W. JACOBY, a citizen of the United States, residing at Abilene, Dickinson county, State of Kansas, have invented certain new and useful Improvements in Check-Rowers for Corn-Planters; and I do hereby declare the following to be a full, clear, and exact description thereof, sufficient to enable others skilled in the art to which said invention appertains to make and use the same, reference being had to the accompanying drawings, in which—

Figure 1:
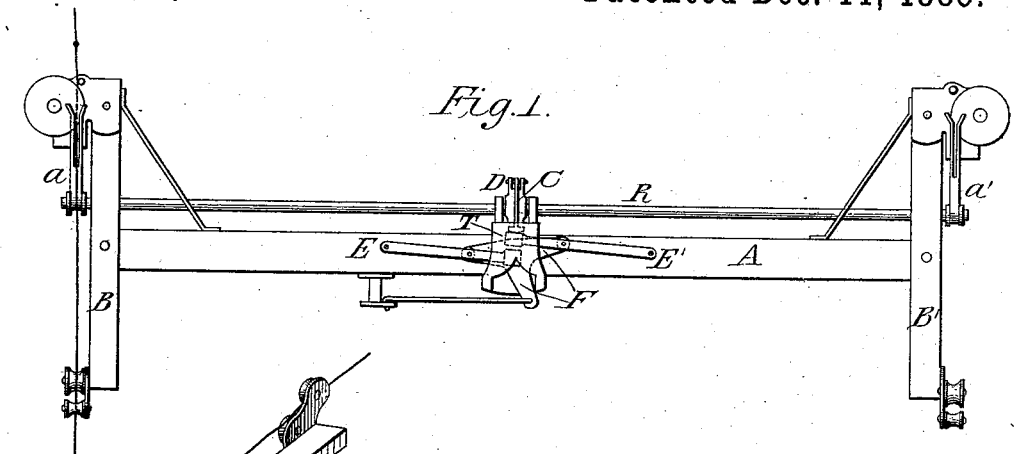
Figure 2:
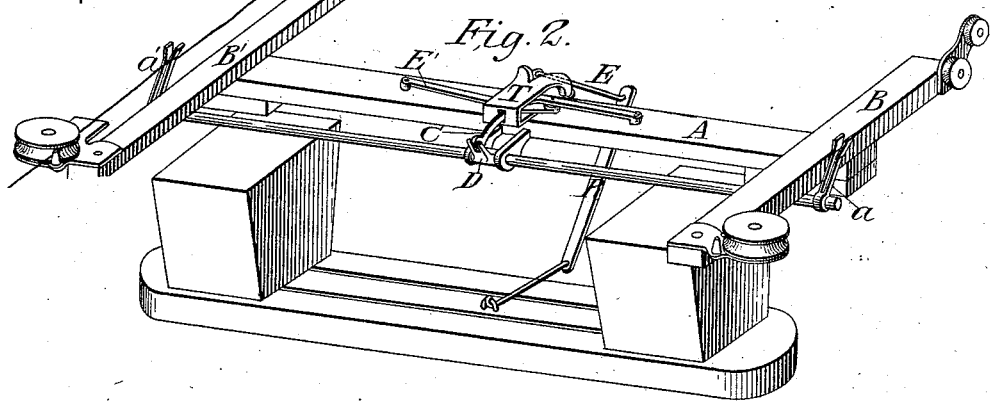
Figure 3:
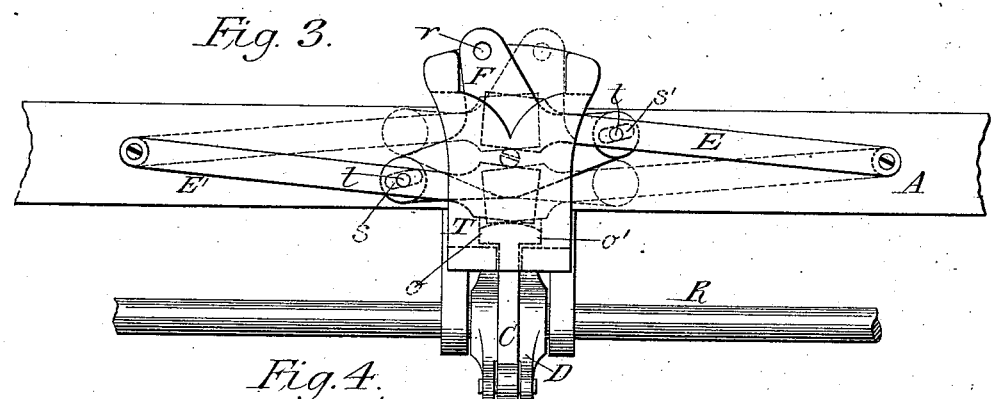
Figure 4:
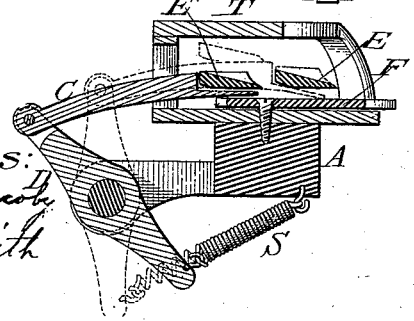

Figure 1 is a plan view. Fig. 2 shows the mechanism with the top removed. Fig. 3 is a cross-sectional view, and Fig. 4 is a detail vertical sectional view.

Similar letters refer to similar parts throughout the drawings.

This invention relates to an attachment for corn-planters for the purpose of enabling the planter to drop the seed in hills in rows each way across the field, without the necessity of marking the ground before planting, by means of a knotted wire or rope stretched across the field to actuate the machinery.

Referring to the drawings, A represents the ordinary cross-bar, attached transversely to the planter, having at both ends the cross-heads B B', with sheaves attached thereto for conducting and holding the knotted wire or rope that passes through them, and the usual forked levers, $a$ $a'$, which, by means of the rotating rod R, actuate the mechanism at or near the center of the cross-bar.

My invention consists of the mechanism at the center of the cross-bar, and is attached to the rod R by the arm D and push-bar C, through which it receives its motion.

E E' are arms standing in opposite directions, with their outer ends attached to the cross-bar A, and their inner ends so constructed that they will simultaneously pass over each other when in motion by being beveled down to an edge on one side, as shown in the drawings.

F is an oscillating or rock plate, with slots $s$ $s'$ on opposite sides, to receive the pins or lugs $t$ $t'$ on the under sides of the arms E E'.

C is a push-bar connected with an arm, D, attached to the rod R.

S is a spring attached to the lower end of rod R at one end and underneath the cross-bar at the other.

T is the top plate, through which the push-bar passes and stops its return motion by means of the projections $o$ $o'$, forming the head of the push-bar.

At $r$ in plate F the pitman is attached that operates the seed-slide of the planter.

Operation: When the planter passes across the field, motion is imparted to the mechanism by means of the tappets or knots in the wire coming in contact with the forked levers $a$ $a'$, pulling them backward, which forces in the push-bar C by means of the arm D, attached to the rod R, which is attached to the forked levers. The push-bar C, when forced in, pushes the arm E before it, which gives motion to the oscillating plate F by means of the pin or lug $t$, on the under side of said arm, working in the slot $s$. As the arm E is pushed forward, the arm E', with the pin or lug $t'$ on its under side working loosely in the slot $s'$, recedes and passes over it on the push-bar C. When the push-bar recedes by means of the spring S, the arm E' drops down in front of it, ready to be pushed forward by the next motion of the push-bar, imparting an opposite motion to the oscillating plate F through the lug or pin $t'$ in slot $s'$, as previously described.

What I claim as my invention, and desire to secure by Letters Patent, is—

1. In a check-rower, the arms E and E', their outer ends pivoted to cross-bar A, and having lugs $t$ $t'$ on their under faces, as shown, formed to work in inclined slots for the purpose specified, said arms being beveled on their inner ends and arranged to pass each other in opposite directions, substantially as set forth.

2. In a check-rower, the cross-bar A, carrying cross-heads B and B', provided with guide spools and pulleys, and the rock-bar R, having arm D, connected by coiled spring S to cross-bar A, in combination with the push-bar C, rock-plate F, and the arms E and E', pivoted at their outer ends, their inner ends arranged to pass each other simultaneously, said arms having projecting pins $t$ $t'$ working in inclined slots, substantially as shown and specified.

3. The combination of the cross-bar A, carrying cross-heads B and B', the rock-shaft R, carrying forked levers a and a', and forked arm D, connected to push-bar C, having T-projections O and O', with the oscillating plate F, top plate, T, the pivoted arms E and E', and the coiled spring S, substantially as shown and specified.

DANIEL W. JACOBY.

Witnesses:
OTIS S. SMITH,
JOHN HILL.